Patented Jan. 12, 1943

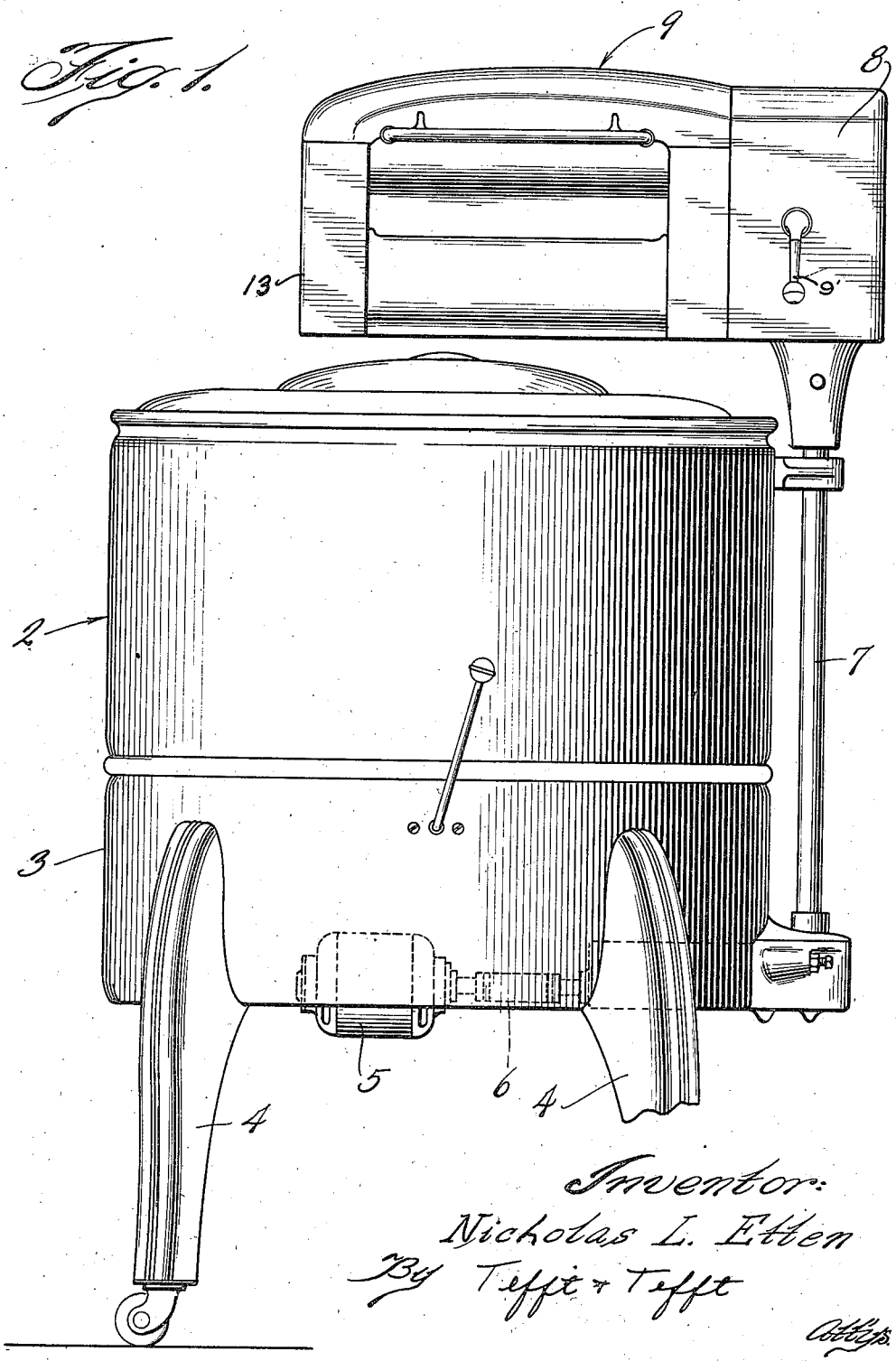

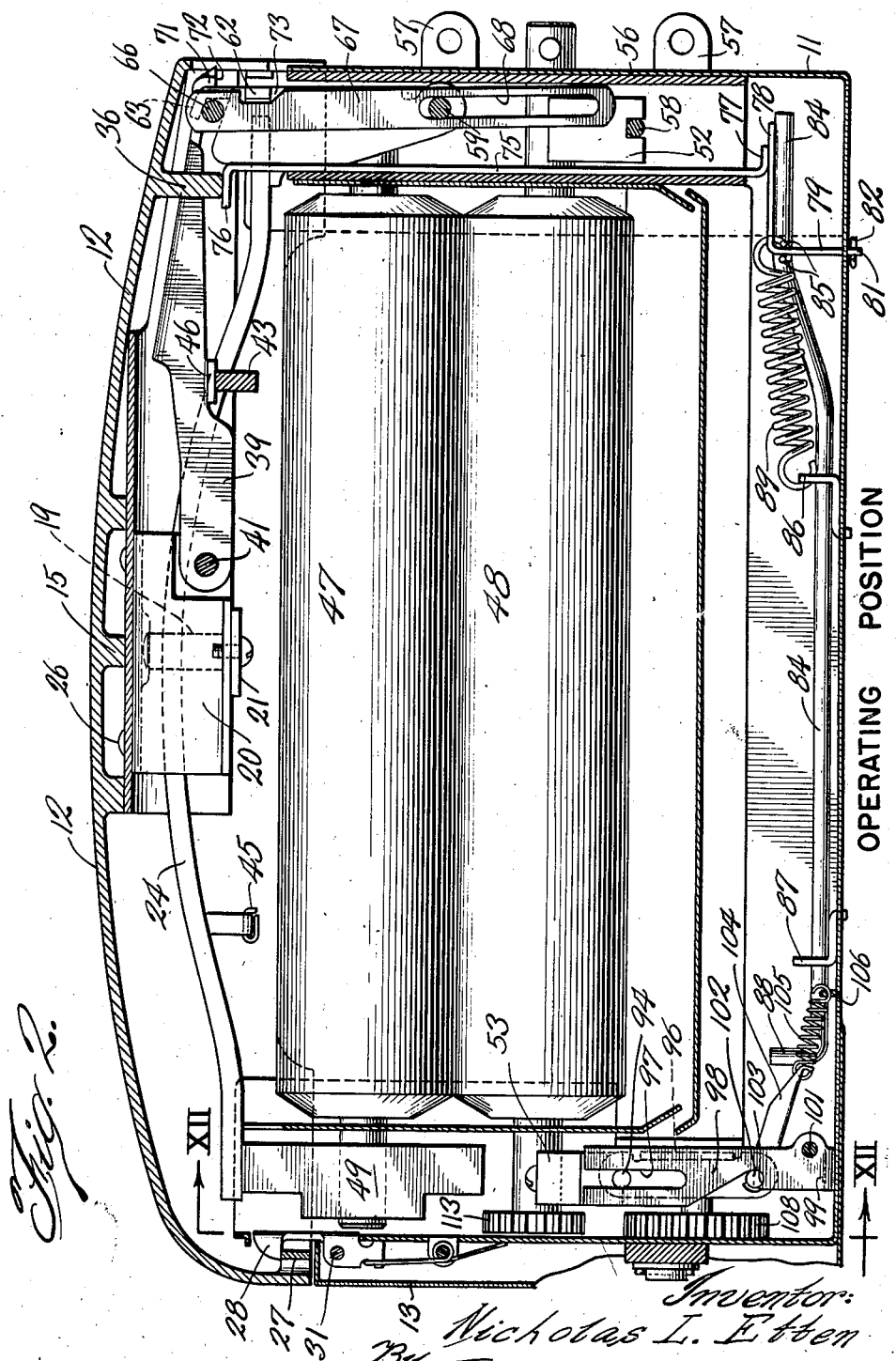

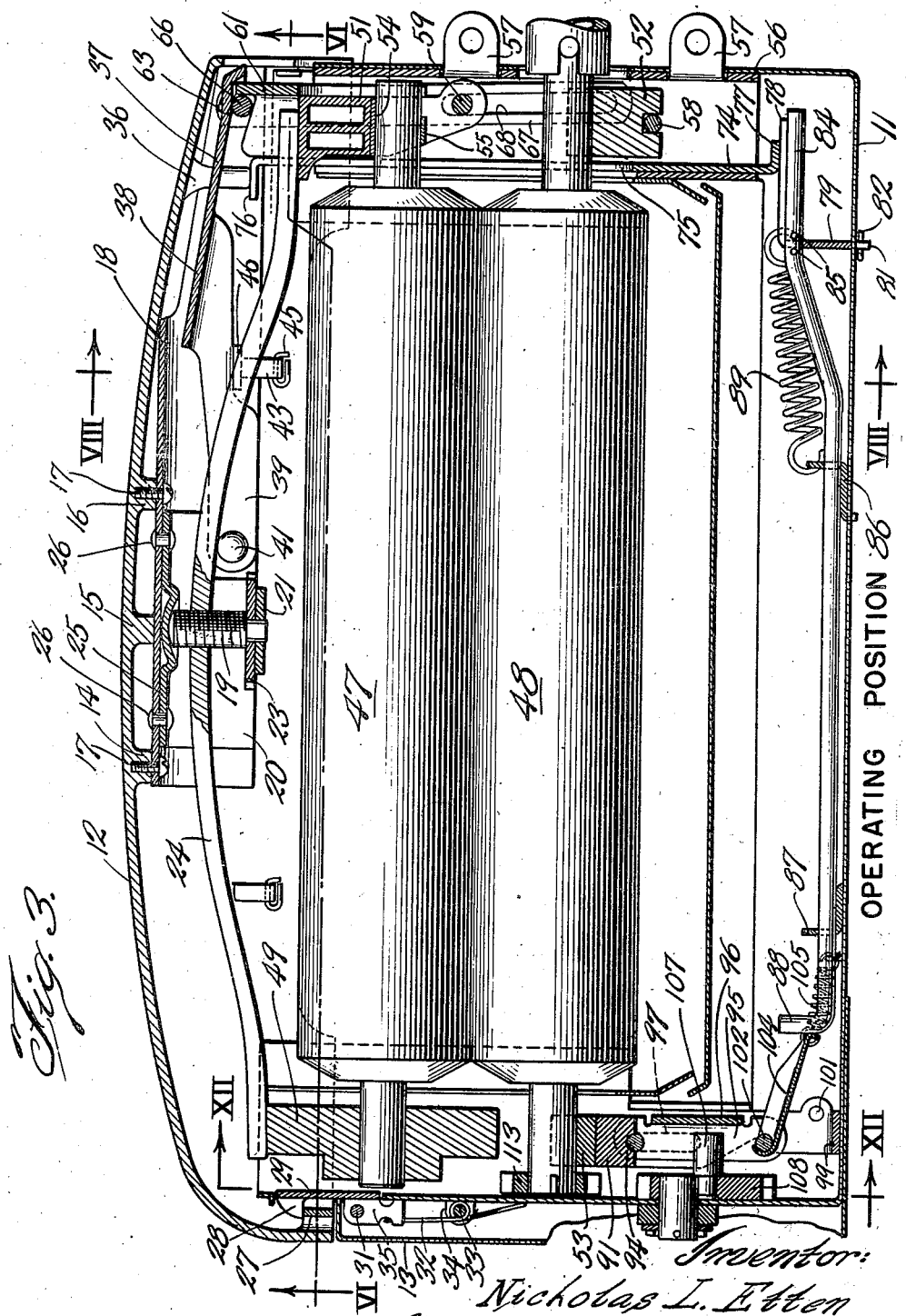

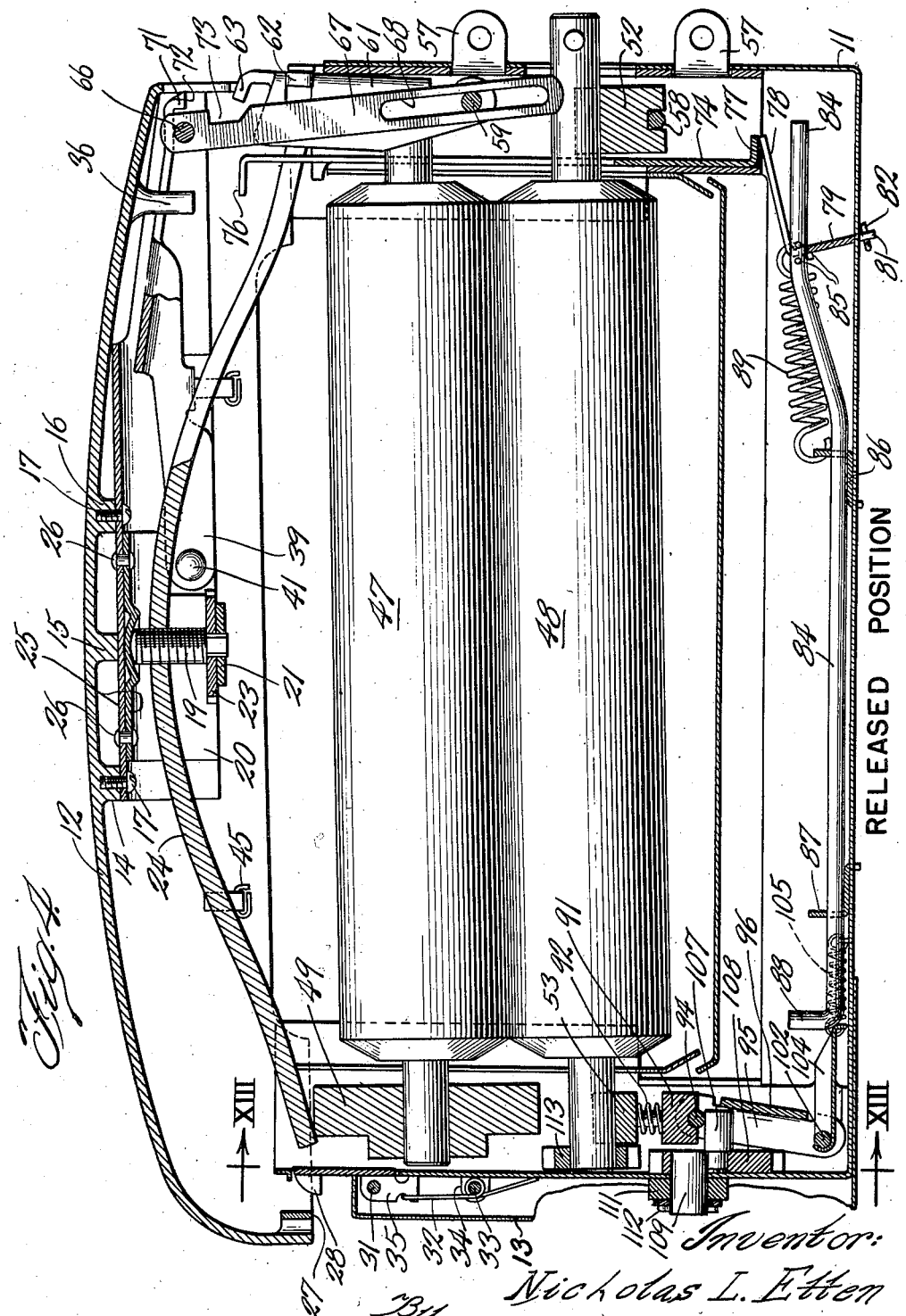

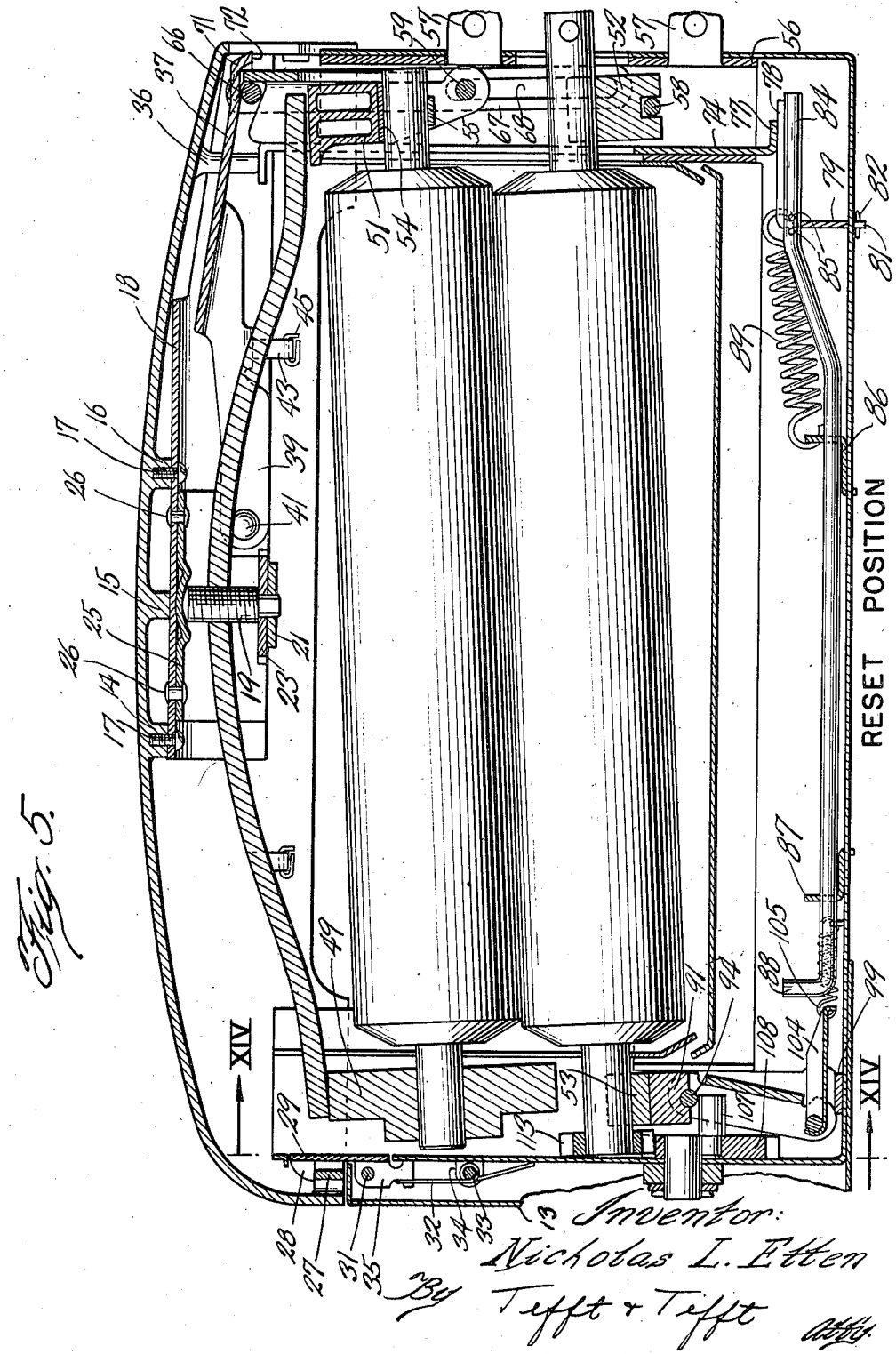

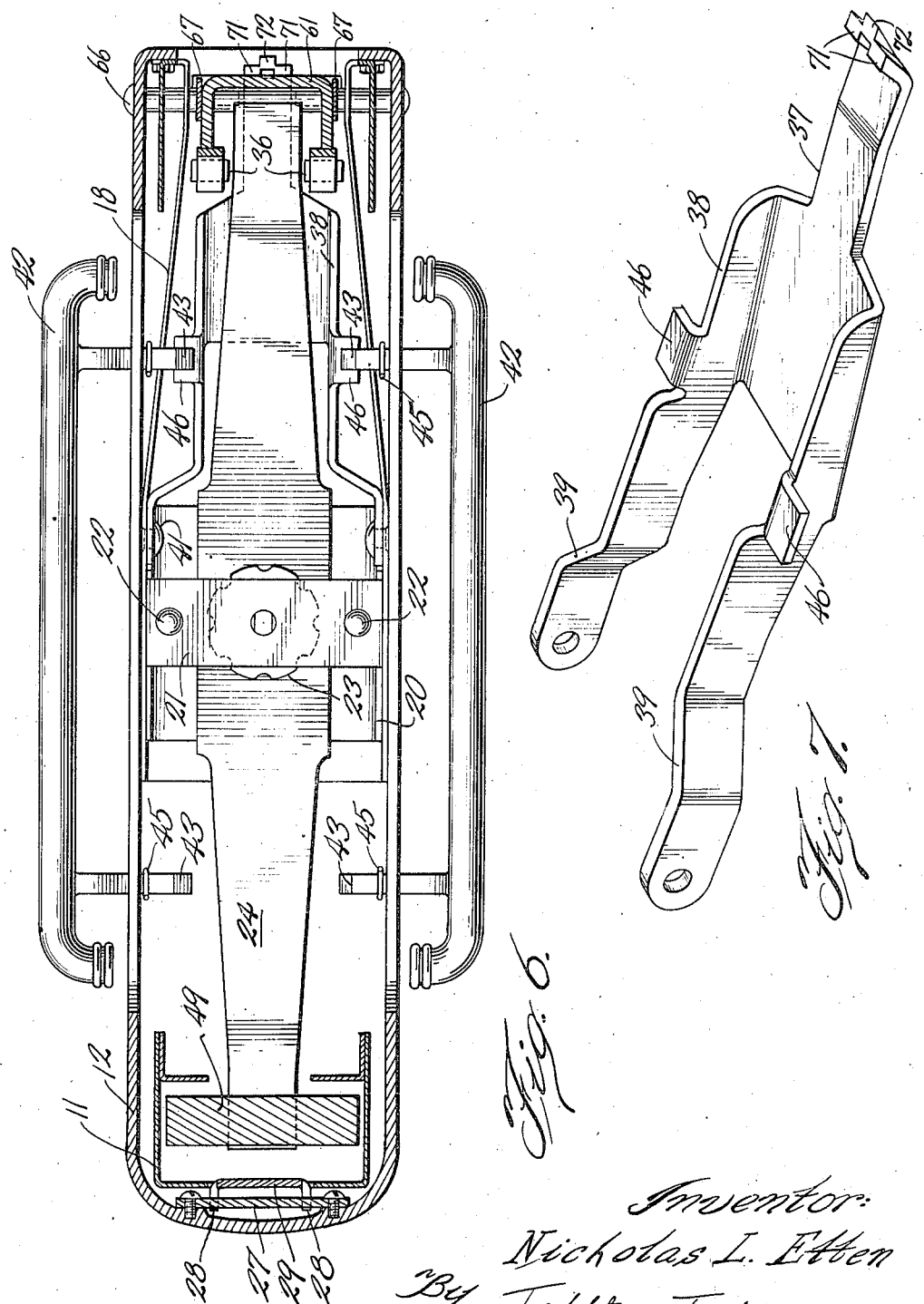

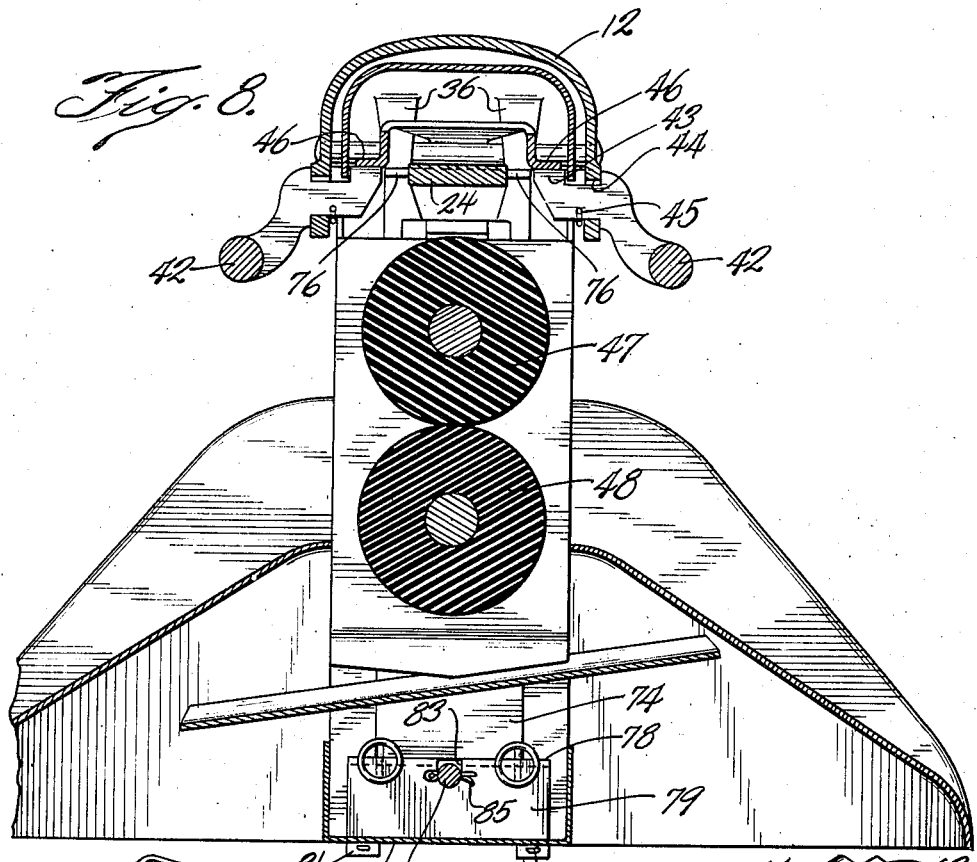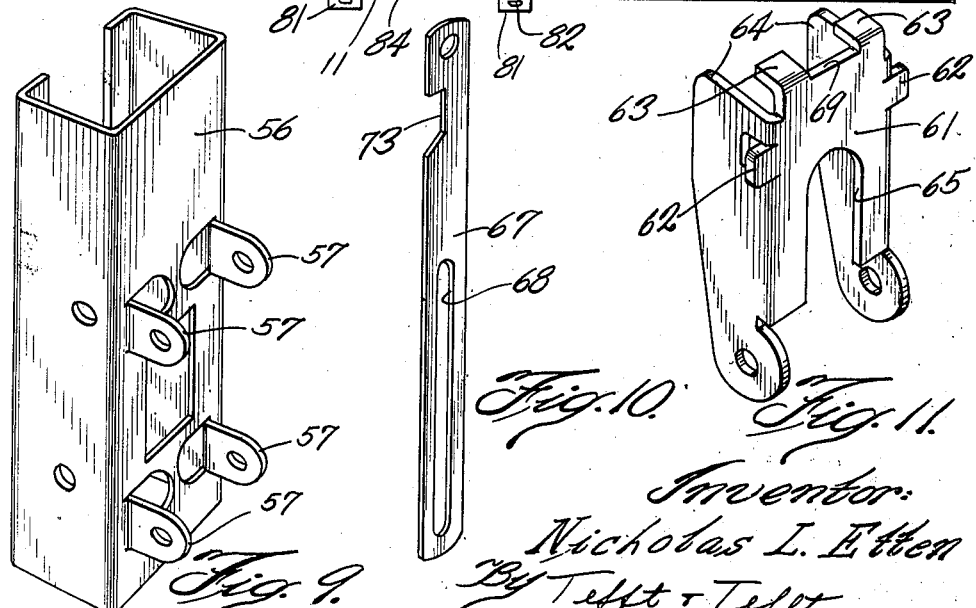

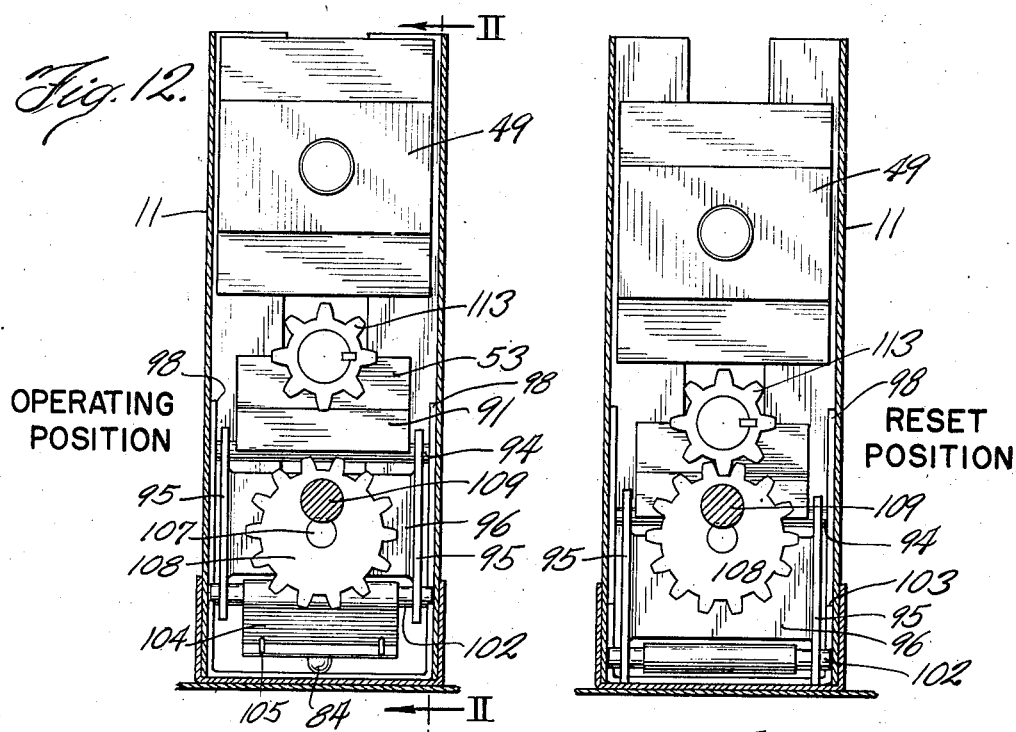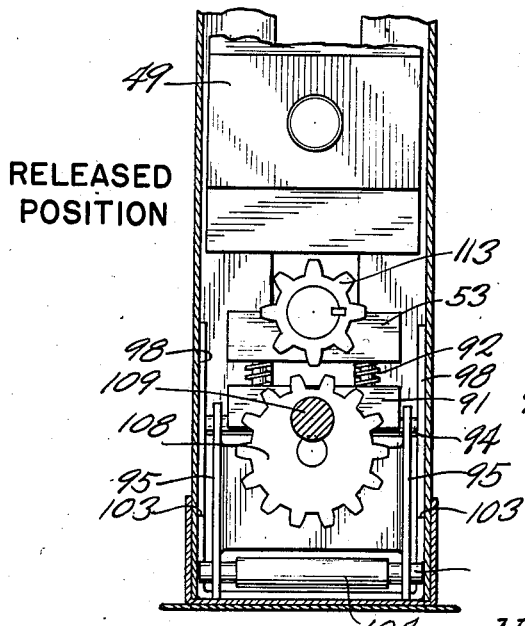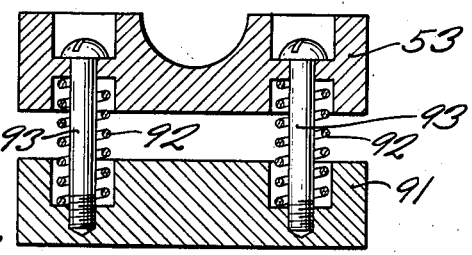

2,308,444

UNITED STATES PATENT OFFICE 2,308,444

POWER RESET MECHANISM FOR WRINGERS

Nicholas L. Etten, Waterloo, Iowa

Application June 19, 1937, Serial No. 149,066

5 Claims. (Cl. 68—258)

This invention relates to wringer roll pressure release and reset mechanism and, more particularly, to power operated types of wringer. While the invention will be disclosed in connection with wringers and has many advantages making it particularly useful for wringer purposes, it is of broader application and may be incorporated in other types of machine employing two or more rolls for the exertion of pressure.

One of the primary objects of the invention is to provide means whereby the pressure on wringer rolls and the like may be substantially instantaneously released in case of an emergency or other need, the means being of such character that the pressure may be re-established with facility and relative ease.

Another important object is to provide mechanism whereby the power supplied to operate the wringer or other rolls in their normal functions may be used to effect or to assist in effecting the restoration of pressure upon the rolls whereby the operator may be relieved of the considerable effort required, in many pressure reset devices now common, to restore the necessary and proper working pressure upon the rolls.

A further important object resides in the provision of mechanism by and through which the roll pressure may be restored by a normal operating function of the wringer itself thereby to avoid the addition of complicated mechanisms and various extra or unusual operations upon the part of the operator. In the embodiment of the invention chosen for illustration the object is attained through the use of one of the rolls, the lower roll, the rotation of which serves to effect the re-establishment of the roll pressure.

A still further object resides in the provision of safety mechanism through which the roll pressure is prevented from being reimposed until the operator is ready to do so and has performed a preliminary operation. The arrangement is such that upon the performance of the preliminary step or operation by the operator and the re-establishment (if disconnected) of a power connection, as by the connection of a clutch or the throwing of a switch, the wringer pressure will be reimposed and the wringer set in operation automatically.

Many other objects as well as the various features, the many advantages and the several uses of the invention will become apparent after reading the following description and claims and after viewing the drawings in which:

Fig. 1 is a front elevation of a washing machine showing an associated wringer embodying a preferred form of the invention;

Fig. 2 is a vertical section through the wringer shown in Fig. 1 taken in a plane substantially parallel to the plane containing the axes of the wringer roll; the rolls being shown in their normal operating position;

Fig. 3 is a vertical sectional view taken in the plane containing the axes of the rolls; the rolls being shown in their normal operating position;

Fig. 4 is a view corresponding to the view of Fig. 3, but showing the rolls and their associated mechanism in released position;

Fig. 5 is a view corresponding to the view of Fig. 3 showing the rolls in a position where they are about to be reset into operative position;

Fig. 6 is a bottom plan view of the releasable wringer head taken along section line VI—VI of Fig. 3;

Fig. 7 is a perspective view of one of the wringer release latch securing members;

Fig. 8 is a vertical section taken substantially along the line VIII—VIII of Fig. 3;

Fig. 9 is a perspective view of a box cage in which certain portions of the wringer mechanism may be housed within the wringer frame;

Fig. 10 is a perspective view of one of the sliding link elements associated with the releasable head frame;

Fig. 11 is a perspective view of a head release latch member;

Figs. 12, 13 and 14 are fragmentary sectional views, each taken along the line XII—XII of Fig. 3 and showing various successive stages of operation of the pressure reset mechanism; and Fig. 15 is an enlarged transverse section of one of the lower bearing members for the lower wringer roll.

The washing machine illustrated in Fig. 1 has an ordinary tub 2 from which a skirt 3 depends and is supported upon legs 4 carried by a suitable frame beneath the tub while behind the skirt 3 is a motor 5 (an electric motor has been illustrated but any other motor may be substituted) which is connected through suitable transmission 6 and a shaft 7 with a so-called power head 8 which supports the wringer and supplies the power for driving the rolls. The power transmission mechanism housed within the head 8 may include a clutch which may be arranged to connect and disconnect the wringer rolls with the transmission. The power head may also carry a suitable switch for starting and stopping the electric motor and a handle 9' extending through the casing of the power head may be provided to connect and disconnect the clutch and also to close and open the switch for controlling the motor. The details of the power transmission per se form no part of the present invention and are merely conventionally illustrated to indicate the general association in which the preferred form of the invention has been embodied; those skilled in the art will understand the construction, arrangement and association of the various devices with which the invention may be incorporated.

The wringer generally designated 9 and shown connected with the power head 8 in Fig. 1 has a one piece bottom and side frame structure 11, a releasable top frame member 12 and a small housing member 13 suitably attached at one side of the frame member 11 and designed to house certain parts. The top frame member 12 is provided with internally projecting lugs 14, 15 and 16 of which lugs 14 and 16 are drilled and tapped to receive screws 17 by which a U-shaped member 18 is attached and secured to the interior of the head frame member, the center lug 15 serving as an abutment for the U-shaped member opposite the place where a spring tension screw 19 is adapted to abut. The screw 19 is pivotally mounted in transverse plate 21 which may be secured in any suitable manner as by rivets 22 to lugs (not shown) formed integral with the depending sides of a U-shaped strengthening member 20, and carries a hand wheel 23 for adjustment purposes. The adjustment screw 19 has threaded engagement with a leaf spring 24 and at its free end abuts against the bottom 25 of member 20 which may be riveted as by rivets 26 to the U-shaped member 18. Rotation of the screw 19 in one direction or the other is adapted to increase or decrease the tension to which the leaf spring 24 may be subjected when the head frame member is secured to the side frame members.

At one end (the left hand end viewing Figs. 2, 3, 4, 5 and 6) the top frame member 12 carries a bar 27 over the top or behind which a pair of latch lugs 28 carried by a latch member 29, are adapted releasably to engage. The latch 29 is pivotally mounted upon a pivot 31 secured between lugs (not shown) formed adjacent to the sides of an aperture in the upper end of this leg of the frame member 11 and is normally held in such position therein, that the latch lugs 28 will engage behind the bar 27. A hairpin spring 32 which is coiled about a pin 33 secured between lugs 34 on the lower frame resiliently urges the latch 29 about its pivot to engaging position. The upper end of the spring 32 may ride in recesses or recessed arms 35 of the latch 29 normally to urge the upper end of the latch outwardly of the opening in the frame and over the latch bar 27 while the lower end of the spring may bear against the outer surface of the lower frame as will be understood. The latch 29 is intended to assume and to maintain the position illustrated in Fig. 3 except at those times when the head frame is being reconnected with the lower frame when the latch bar 27 will engage with the upper or rounded cam surface of the latch lugs 28 and will temporarily move the latch in a clockwise direction against the tension of the spring 32, the spring thereafter snapping the latch lugs 28 over and behind the bar 27.

The right hand end of the top frame member 12, viewing Figs. 2, 3, 4, 5 and 6, has a pair of spaced depending lugs 36 for a purpose hereinafter described and between which a tongue portion 37 of a release latch securing member 38 (Fig. 7) is adapted to move since the latch securing member 38 has a pair of forked arms 39 pivotally secured to the U-shaped member 18 as by rivets 41. The latch securing member 38 normally drops under the influence of gravity to the position shown in Figs. 2 and 3 in which position it holds the release latch in secured position as will hereinafter be described, but is moved upwardly to release the latch by emergency release arms 42 which are disposed on opposite sides of the head frame 12. Each emergency release arm carries a pair of projections 43 which pass loosely through apertures 44 in the sides of the top frame member 12 and are held therein by any suitable fastening means 45 for rocking movement. One projection 43 of each arm 42 is adapted to underlie an ear 46 formed integral with the latch securing member 38 and normally is arranged barely to contact therewith when the wringer is in its operating condition. In case of an emergency the operator grasping either arm 42 and pulling downwardly thereon rocks the projection 43 connected with that arm in an upward direction thereby raising the latch securing member 38 which in turn releases the latch as will hereinafter appear.

Upper and lower wringer rolls 47 and 48, respectively, have their shaft ends mounted in bearings 49, 51, 52 and 53, respectively, disposed in the vertical portions of the bottom frame member. The bearing 49 which may be made of hard wood is mounted directly within the side portion of the bottom frame member and is adapted to slide up and down therein in the usual manner, the frame member being open at its inner side to permit the vertical movements of the roll. The bearing 51 is preferably of cast metal and carries a half bushing 54 within which the shaft end of the upper roll may rotate. The top portions of the bearings 49 and 51 are provided with flats upon which the ends of the leaf spring 24 may rest and the bearing 51 has a small U-shaped strap 55 which extends about the end of the upper roll shaft and is secured to the bearing 51 by screws (not shown) so as to releasably hold the shaft to the bearing when the bearing rocks as will appear hereinafter. The bearing 51 is mounted both for vertical sliding movements and for rocking movements within a heavy metal stamped cage 56 which is fitted within the right hand vertical portion of the bottom frame member and provided with outwardly directed lugs 57 by which the wringer may be attached to a power head. The bearing 52 for the right hand end of the shaft of the lower roll 48 is notched transversely at its bottom edge to receive a pin 58 upon which and about which to a limited extent the bearing 52 may pivot, the pin 58 being secured at its ends to the walls of the cage 56. The bearing 53 is supported in a peculiar manner as will hereinafter appear.

Disposed below the lowest level to which the shaft of the upper roll 47 may be moved under the influence of spring 24 and secured at its ends in the cage 56, is a pivot pin 59 upon which the lower end of the latch member 61 is pivoted for movement between a latch engaged position and a latch disengaged position. The latch 61 is shown in perspective in Fig. 11 from which it will be noted that it may be formed as a sheet metal stamping. The latch member 61 is provided with a pair of ears 62, a pair of latch dogs 63, straight surface portions 64 and a recess 65. The right hand end of the releasable top frame member 12 carries a transversely extending pin 66 of round cross section over which the latch dogs 63 engage normally to hold the top frame member to the bottom frame member with the spring 24 under compression and pivotally mounted upon this pin 66 are a pair of links 67 which at their lower ends are slotted, as shown at 68, for the passage of the transverse pivot pin 59. Since the links 67 are secured to the top frame member and the pivot pin 59 is disposed through the closed slot 68, the top frame member cannot rise beyond the fixed position determined by the length of the slots 68. Between the latch dogs 63, the latch 61 is provided with a squared shoulder 69 over which latch dogs 71 of the latch securing member 38 are adapted to engage to hold the latch 61 in its normal position with the latch dogs 63 engaged over the top of the pin 66.

The parts are shown in their normal operating position in Figs. 2 and 3, and in released position in Fig. 4. The latch securing member 38, when formed to provide the dogs 71, is also formed with a projection 72, the bottom surface of which is a continuation of the bottom surfaces of the dogs 71, so as to give a bearing surface wide enough to permit the necessary release movement of the latch 61 without riding beyond these surfaces. This arrangement will prevent any possibility of the latch riding outwardly of the latch dogs 71 and engaging over the top of securing member 38, instead of moving to its proper position with the shoulder 69 beneath and behind the dogs 71. The ears 62, on the other hand, are provided in order to prevent the latch member 61 from swinging in under latch pin 66 when the head frame is being reconnected after release, the arrangement being such that the ears 62 will contact the edges of links 67 should the latch pivot inwardly too far, and will be guided thereby until the dogs 63 assume their proper positions with respect to latch pin 66. The links 67 are cut away, as shown at 73, to admit the ears 62 when the parts are latched together.

While it is believed that the operation of the mechanism for securing and releasing the top frame member 12 and thereby the tension of the spring 24, is more or less apparent from the description so far given, nevertheless it will be briefly reviewed. Should an emergency arise as when the operator's person or clothing becomes caught between the wringer rolls during their operation, the operator may release the head by grasping either handle or release bar 42 and pulling down thereon. The pull upon the release bar or handle will rock the projection 43 upwardly, thereby raising the latch securing member through contact with a lug 46. As the latch securing member 38 swings upwardly about its pivots 41 the latch dogs 71 will be released from behind the shoulder 69 and as the latch dogs 63 are in camming relationship with the latch pin 66, the tension of the spring 24 will cause the latch member 61 to swing about its pivot 59 to release the head frame and the head frame will spring upwardly and toward the left from the position shown in Figs. 2 and 3 to the position shown in Fig. 4. The tension will be immediately released from the rolls 47 and 48, it being understood, of course, that the pressure exerted by spring 24 is transmitted from the roll 47 to the roll 48. In order to reconnect the head frame member 12 with the bottom frame member 11 the operator merely presses the head frame downwardly until the latch lugs 28 snap over the latch bar 27 at one end and the latch dogs 63 engage behind latch pin 66 and latch, securing the latch 61 in secured position with the latch dogs 71 engaged behind shoulder 69. Through mechanism now to be described the operator may reset the top frame member in its operating position without placing very much tension upon the spring 24 and therefore without material exertion.

A vertically slidable member 74, longitudinally slotted as at 75 for the passage of the shafts of the wringer rolls 47 and 48 and normally guided in its vertical sliding movements between the side walls of the cage 56 and between the inner end wall of the cage and straight edge portions 64 of the latch 61, is provided with right angle portions 76 at its upper end and a right angle portion 77 at its lower end. The portions 76 are adapted to abut against the lugs 36 when the top frame member 12 is connected with the bottom frame member and under these conditions the lower right angle portion 77 is abutting against the top leg 78 of an L-shaped rock plate, the other leg 79 of which has a pair of lugs 81 which pass loosely through slots in lower frame member 11 and are retained by means of cotter keys or the like 82. The center of leg 79 at the juncture of the legs of the rock plate, is provided with an aperture 83 through which one end of a rod 84 loosely extends, being retained against displacement from the slot by any suitable means such as cotter keys 85.

Rod 84 is slidably mounted for endwise movements through brackets 86 and 87 which may be welded or otherwise secured to the bottom frame member 11 and at its end adjacent to the bracket 87 has an upturned portion 88 the purpose of which will shortly appear. A pair of coiled tension springs 89, secured to the leg 78 of the rock plate at one end of each and at their other ends to the bracket 86, normally tend to rock the rock plate in a counterclockwise position from the positions indicated in Figs. 2 and 3 to the position indicated in Fig. 4 and simultaneously to urge rod 84 to the left viewing Figs. 3 and 4. However, the abutment of the portion 76 of the slide 74 against the lugs 36 normally prevents the springs 89 from effecting movement of the rock plate or the rod 84. As soon, however, as the latch member 61 is released from the latch pin 66, the tension of springs 89 will move the rod 84 to the left and will rock the rock plate raising leg 78 upwardly, in turn raising the slide 74 so that these parts assume the position illustrated in Fig. 4. The movement of the rod 84 under the influence of springs 89 is designed to operate the mechanism for dropping the rolls 47 and 48 to a position where the head frame 12 may be reconnected with the bottom frame 11 with the imposition of a minimum of tension upon the spring 24.

The bearing member 53 is mounted upon a block 91 (Fig. 15) through springs 92 and stud screws 93, the springs normally resting in recesses formed in the bottom of bearing 53 and the top of block 91 and the stud screws 93 being secured in block 91 but slidable through suitable holes drilled in bearing 53, the arrangement being such that the bottom of the bearing 53 may abut against the top of the block 91 when the springs 92 are compressed. The block 91 is supported upon a transverse pin 94 which is secured at places spaced from its ends to links 95 which are integrally joined together by a bridge 96. The outer extremities of the pin 94 are designed to ride in slots 97 provided in upstanding arms 98 of a U-shaped bracket 99 the bottom of which rests upon the inside bottom surface of the frame member 11 and is secured thereto as by a rivet 101. The lower ends of the links 95 are connected by a pin 102 which, when the rolls are in operating position, rests at its ends in open notches 103, formed in the upstanding arms 98 of the U-shaped bracket 99. It will be apparent, therefore, that the bearing 53 is in effect supported upon the bracket 99 and in the open notches 103 through the pin 102 and it will also be apparent that if the pin 102 is displaced from the notches 103 the bearing 53 and the rolls 47 and 48 are free to drop under the influence of gravity from the positions illustrated in Figs. 2 and 3 to the positions illustrated in Figs. 4 and 5.

The pin 102 is pivotally secured to a push bar 104 at one end of the latter and the push bar at its other end is connected with one end of a tension spring 105, the other end of which may be secured to a lug 106 struck from the bottom frame member 11. Normally the spring 105 exerts sufficient pull upon the push bar 104 to retain the pin 102 in the notches 103 and the spring connected end of bar 104 in the path of movement of and in abutting relation to the end 88 of rod 84, but as the spring 105 is weaker than the springs 89, the springs 89, when the head frame member 12 is released, may urge the upturned end 88 of rod 84 toward the left. As the upturned end 88 of rod 84 is normally in abutment against the push bar 104, the movement of rod 84 to the left will push pin 102 out of notches 103 to permit the bearing 53 and the rolls to drop to the position illustrated in Fig. 4 where the pin 94 may come to rest on a crank pin 107. The crank pin 107 is secured at the center of a gear 108 which is eccentrically mounted on a shaft 109 rotatably disposed through the bottom frame 11 and through a bearing washer or the like 111 secured by cotter key or the like 112. The adjacent end of the shaft of the lower roll 48 is provided with a gear 113 adapted under certain conditions to mesh with and to rotate the gear 108 to effect the resetting of the rolls and their bearings in operating position.

It will be assumed, for the purpose of describing the resetting of the rolls and of the head frame member, that the operator has re-started the motor and has re-connected the clutch if the motor and clutch have been disconnected. The parts at this time may be assumed to be in the position illustrated in Fig. 4. With the motor running and the clutch connected, the roll 48 will be in rotation and will be rotating the roll 47 through frictional contact therewith but no pressure other than the weight of the roll 47 and its associated parts will exist between the rolls which will lie in their biased positions as shown. The operator will then reset the top frame member 12 in latched position and in doing so will place a small amount of tension on the spring 24 but, ordinarily, an amount of tension only sufficient to overcome the tension of springs 92 which will collapse these springs permitting the bearing member 53 to abut against the block 91. As the bearing 53 moves into engagement with the block 91, the teeth of gear 113 will come into mesh with the teeth of gear 108 and as roll 48 is rotating the gear 113 will rotate gear 108 and simultaneously will swing crank pin 107 about the shaft 109. The eccentricity of the mounting of gear 108 will raise the gear 113 and the rolls 48 and 47 as the high point of gear 108 moves from its normal bottom dead center position to top dead center position and at the same time the crank pin 107 bearing against the transverse pin 94 will raise the pin 94, the block 91 and bearing member 53 back to normal operating position.

The resetting of the head frame member in latched position will have caused bosses 36 to depress the slide 74 thereby to pull the rod 84 back to its normal position thereby, in turn, permitting the spring 105 to pull push bar 104 toward the right and to draw pin 102 into notches 103. The continued rotation of roll 48 causes gear 113 to rotate gear 108 past top dead center with respect to its shaft 109 and as the gears continue to rotate the action of gravity plus the rotation will cause gear 108 to drop out of mesh with gear 113 and to return to the normal position illustrated in Figs. 2 and 3. Until the head frame 12 is latched in normal operating position the spring 24 cannot exert any material pressure upon the rolls which may be rotating or still, depending upon whether or not the motor is running and the power head clutch is connected. However as soon as the head frame is connected and the gears 113 and 108 are engaged with the power on the bottom roll, the roll pressure will be re-set.

While I have illustrated and described what is at present a preferred embodiment of the invention, it will be appreciated that it is susceptible of embodiment in other wringers and in other forms as well as susceptible of many modifications, all without departing from the invention spirit or the scope of the appended claims.

I claim:

1. In a power pressure reset wringer, a frame, a lower roll mounted for tilting movement in said frame, an upper roll, spring pressure means for the rolls, power means actuated by rotation of the lower roll to raise the lower end of the tilted roll to horizontal pressure relationship with the upper roll, and latch means for securing the tilted end of the lower roll in horizontal operating pressure relationship.

2. In a power pressure reset wringer, a frame, a lower roll mounted for tilting movement in said frame, an upper roll, spring pressure means for the rolls, power means including a spur gear mounted upon the lower roll, a mating eccentric gear mounted upon the frame to force the lower roll into operating pressure relationship with the upper roll, and latch means for securing the tilted end of the lower roll in such operating pressure relationship.

3. In a power pressure reset wringer, a lower frame, an upper frame releasably attached to the lower frame, roll members mounted in a tilted position in the lower frame when in inoperative position, spring pressure means for the rolls, power means actuated by rotation of one of the rolls to raise the rolls into horizontal operating pressure relationship, and latch means to secure the rolls in such relationship.

4. In a power pressure reset wringer, a lower frame, an upper frame releasably attached to the lower frame, roll members mounted in tilted position in the lower frame when in inoperative position with the upper frame detached from the lower frame, spring pressure means for the rolls, power means actuated by rotation of one of the rolls upon the attachment of the upper frame to the lower frame to raise the lower tilted ends of the rolls into horizonal operating pressure relationship, and latch means to secure the rolls in such relationship.

5. In a power pressure reset wringer, a lower frame, an upper frame releasably attached to the lower frame, roll members mounted in tilted inoperative position in the lower frame with the frames detached, spring pressure means for the rolls, power means actuated by rotation of one of the rolls for raising the lower tilted ends of the rolls including a spur gear mounted on the lower roll, a mating eccentric gear mounted on the frame to raise the ends of the rolls into horizontal operating pressure relationship when the top frame is attached to the lower frame, latch means to secure the rolls in operating horizontal relationship when the rolls are raised by the eccentric gear, and safety release means for instantly detaching the upper frame to permit the rolls to drop into tilted inoperative position, said tilted inoperative position of the rolls permitting easy attachment of the frames and resetting of the rolls in the horizontal pressure relation position.

NICHOLAS L. ETTEN.